(12) United States Patent
Choplin et al.

(10) Patent No.: US 10,766,650 B2
(45) Date of Patent: Sep. 8, 2020

(54) CONTROLLED FEED FOR BATCH PACKAGING

(71) Applicant: SIDEL PACKING SOLUTIONS, Corcelles-les-Citeaux (FR)

(72) Inventors: Gregory Choplin, Corcelles les Citeaux (FR); Jean-Francois Grouas, Corcelles les Citeaux (FR); Philippe Derouault, Corcelles les Citeaux (FR)

(73) Assignee: SIDEL PACKING SOLUTIONS, Corcelles-les-Citeaux (FR)

( * ) Notice: Subject to any disclaimer, the term of this patent is extended or adjusted under 35 U.S.C. 154(b) by 0 days.

(21) Appl. No.: 15/572,152

(22) PCT Filed: May 4, 2016

(86) PCT No.: PCT/FR2016/051052
§ 371 (c)(1),
(2) Date: Nov. 6, 2017

(87) PCT Pub. No.: WO2016/177972
PCT Pub. Date: Nov. 10, 2016

(65) Prior Publication Data
US 2018/0111710 A1 Apr. 26, 2018

(30) Foreign Application Priority Data
May 7, 2015 (FR) ...................... 15 54112

(51) Int. Cl.
*B65B 35/40* (2006.01)
*B65B 21/24* (2006.01)
(Continued)

(52) U.S. Cl.
CPC ............ *B65B 35/405* (2013.01); *B65B 11/10* (2013.01); *B65B 21/245* (2013.01); *B65B 35/16* (2013.01);
(Continued)

(58) Field of Classification Search
CPC .... B65G 47/088; B65G 47/32; B65G 47/682; B65G 47/715; B65G 47/842;
(Continued)

(56) References Cited

U.S. PATENT DOCUMENTS 3,193,078 A 7/1965 Amenta et al.
4,880,103 A 11/1989 Ludwig et al.
(Continued)

FOREIGN PATENT DOCUMENTS

CA 2330454 A1 6/2001
DE 42 13 557 A1 10/1993
(Continued)

OTHER PUBLICATIONS

International Search Report, dated Aug. 5, 2016, from corresponding PCT application No. PCT/FR2016/051052.

*Primary Examiner* — Gene O Crawford
*Assistant Examiner* — Keith R Campbell

(57) ABSTRACT

A packaging device for packaging products in batches, during which the products travel along a conveying direction in order to be packaged and related method. The batches include at least two products, arranged transversely to the conveying direction. The device includes a feeder for receiving products travelling in single file through an upstream pick-up area and conveying same to a set-down area for later packaging. The feeder includes: in the pick-up area, a transfer unit for transferring products arriving in single file to the unit; and at least one position-controlled movable collector for receiving and then moving at least one product in a controlled manner from the transfer unit to the set-down area. The device also includes a conveyor in the set-down area, on which the collector deposits the product collected from the pick-up area.

20 Claims, 8 Drawing Sheets

(51) Int. Cl.

| | | |
|---|---|---|
| *B65B 35/16* | (2006.01) | |
| *B65B 35/26* | (2006.01) | |
| *B65B 53/06* | (2006.01) | |
| *B65G 47/08* | (2006.01) | |
| *B65B 11/10* | (2006.01) | |
| *B65B 65/00* | (2006.01) | |
| *B65B 35/24* | (2006.01) | |
| *B65B 35/44* | (2006.01) | |
| *B65G 47/86* | (2006.01) | |
| *B65G 47/32* | (2006.01) | |

(52) U.S. Cl.
CPC .............. *B65B 35/24* (2013.01); *B65B 35/26* (2013.01); *B65B 35/44* (2013.01); *B65B 53/063* (2013.01); *B65B 65/003* (2013.01); *B65G 47/088* (2013.01); *B65G 47/32* (2013.01); *B65G 47/842* (2013.01); *B65G 2201/0244* (2013.01)

(58) Field of Classification Search
CPC .. B65G 47/846; B65G 47/901; B65G 47/902; B65G 47/918; B65G 54/02; B65G 2201/0244; B65B 11/10; B65B 21/245; B65B 35/16; B65B 35/24; B65B 35/26; B65B 35/36; B65B 35/405; B65B 35/44; B65B 53/063; B65B 65/003
See application file for complete search history.

(56) References Cited

U.S. PATENT DOCUMENTS

| | | | |
|---|---|---|---|
| 5,235,996 A | | 8/1993 | Beswick |
| 6,223,884 B1 * | | 5/2001 | Ronchi ................ A44B 11/006 |
| | | | 198/457.01 |
| 6,520,316 B2 | | 2/2003 | De Guglielmo et al. |
| 7,232,026 B2 | | 6/2007 | Heuft et al. |
| 7,326,308 B2 | | 2/2008 | Mace et al. |
| 7,416,072 B2 | | 8/2008 | Gosset |
| 8,025,143 B2 | | 9/2011 | Baumstimler et al. |
| 8,167,113 B2 * | | 5/2012 | Mougin ................ B65G 47/82 |
| | | | 198/370.07 |
| 8,668,072 B2 * | | 3/2014 | Gatos ................... B65G 47/088 |
| | | | 198/429 |
| 9,682,829 B2 * | | 6/2017 | Keil ..................... B65G 47/71 |
| 9,809,392 B2 * | | 11/2017 | Walter .................. B65G 37/02 |
| 9,950,875 B2 * | | 4/2018 | Walter .................. B65G 15/22 |
| 2010/0193326 A1 * | | 8/2010 | Mougin ............... B65G 47/082 |
| | | | 198/426 |
| 2012/0118701 A1 * | | 5/2012 | Duchemin .......... B65G 47/088 |
| | | | 198/429 |
| 2012/0273324 A1 * | | 11/2012 | Mougin ............... B65G 47/088 |
| | | | 198/426 |
| 2016/0207717 A1 * | | 7/2016 | Senn ..................... B65G 37/02 |
| 2018/0141688 A1 * | | 5/2018 | Choplin ............... B65B 21/245 |

FOREIGN PATENT DOCUMENTS

| | | | | |
|---|---|---|---|---|
| DE | 102011085724 A1 * | 5/2013 | ........... | B65G 47/088 |
| EP | 1379457 B1 | 4/2006 | | |
| EP | 1 537 037 B1 | 12/2006 | | |
| EP | 2 471 728 A1 | 7/2012 | | |
| EP | 2471728 | * 7/2012 | | |
| EP | 2936787 B1 | 8/2016 | | |
| FR | 2 604 693 A1 | 4/1988 | | |
| FR | 2823190 A1 | 10/2002 | | |
| FR | 2 847 242 A1 | 5/2004 | | |
| FR | 2 907 437 A1 | 4/2008 | | |
| WO | 01/12383 A1 | 2/2001 | | |
| WO | 03/047977 A2 | 6/2003 | | |
| WO | 2014/206733 A1 | 12/2014 | | |
| WO | 2015085304 A1 | 6/2015 | | |

* cited by examiner

CONTROLLED FEED FOR BATCH PACKAGING

BACKGROUND OF THE INVENTION

Field of the Invention

This invention relates to the field of packaging products in batches, and has as its object a particular packaging device, as well as a method for feeding the packaging device.

Description of the Related Art

In this field, the processed products are of the jar, bottle, etc., type and undergo a first phase during which they are finished individually, i.e., essentially filled, capped, and labeled. At the output of such a phase, the equipment generally operates on the basis of a rotating carousel, on the periphery of which the labeled products are picked up. CA2330454 discloses, for example, a star solution on the periphery of which the products are individually carried.

After this first preparation step of a product that is then ready to use, a second packaging step is introduced for the purpose of obtaining, at the output, batches of several products, grouped together in a rectangular matrix, with or without staggering, and kept together by a covering of the plastic film type, with or without a bottom part made of a cardboard tray, for example. At the output of this second packaging step, the products therefore appear in a group within which they are held, such as a bundle, for example. These batches generally appear in the form of a rectangular base, several products extending along each of the two edges. A heating oven is traditionally used to ensure that the film, wrapped around these products that are organized in a matrix, ensures, by shrinking, the holding-together of the various products. EP1379457 thus discloses, for example, a wrapping solution, by film, of a batch of products. Such secondary packaging equipment is, for example, a bundler, which therefore processes products that, at the input, are distributed transversely to the direction of advance.

For this second packaging step, it is therefore necessary to transform a flow from a single-line configuration upstream, at the output of the preparation group, to a multi-line configuration, i.e., with several longitudinal columns, each intended to form a longitudinal portion of a batch.

In bundling packaging equipment, the following steps are generally performed before the wrapping by film, or covering: organization of the flow into separate channels, defining the number of products of a batch that are in the transverse direction; periodic longitudinal separation of the products to define the number of products of a batch in the longitudinal direction, as proposed in, for example, EP2936787; spacing, by means of a feed cycler, of the batches thus created to be synchronized with the wrapping or covering module; then transfer to the covering conveyor by means of the cycler and a dead plate.

For transforming the flow into several channels, FR2847242 proposes, for example, to set up, on the one hand, a conveyor for a single-line flow of products, and, on the other hand, inclined relative to the preceding one, a conveyor for a multi-line flow. Under the action of a pusher moving longitudinally on the second conveyor, the inclination between the two conveyors directly transforms, by geometric projection, the single-line flow into transverse rows; then all it takes is to bring them close to one another to obtain a compact multi-line flow.

U.S. Pat. No. 3,193,078 for its part proposes a movable conveyor portion, one end of which is stationary and receives the products furnished by the single-line flow, and the opposite end of which moves, by pivoting of said portion, to come facing one downstream circulation channel, among many.

FR2907437 for its part proposes a solution alternatively using a movable intermediate element, receiving the products, after an angled portion, and distributing them in several circulation channels.

A traditional way of transforming a single-line flow into a multi-line flow is based optionally also on an intermediate step of loose conveying, where the products are organized then generally by staggering. FR2604693 proposes, for example, a solution that optimizes the transition from a single-line flow to a multi-line flow. One of the major drawbacks of such a solution is that the crucial subsequent transition from such an overlapping staggered organization to an organization where the products are simply side by side quite often produces jamming and is therefore not reliable particularly at high speed or for products that are not very stiff.

DE4213557 proposes, for example, a guide that flares out above a conveying means that gradually slows, which naturally ends in this configuration of the staggered products, then to be separated into channels. EP1537037 thus proposes a frame that is movable to agitate the loose flow and then to force the transition into separate predefined channels. U.S. Pat. No. 5,235,996 for its part finally proposes a solution of longitudinally alternating movable walls, in the extension of the walls that define the channels. These principles, however, do not make it possible systematically to avoid jamming.

Therefore, there is today in the state of the art a need to improve the feeding of a machine for packaging products in matrix batches, of the bundling type, so as, in particular, to avoid the failures caused by falling, jamming, or the like, that happen during the transition from a single-line distribution of the products to a transverse distribution of the products.

BRIEF SUMMARY OF THE INVENTION

The invention thus aims to propose a solution in which the feeding of a batch packaging machine is reliable, and also makes possible, as far as practicable, an overall configuration that is versatile and not very bulky.

To do this, the invention proposes using a transfer of products during which each product is referenced and whose position can thus be known and controlled individually. After preparation of the products, the latter are picked up and moved in a controlled way to the input zone of the bundling packaging station, then are deposited there, distributed transversely. Thus avoided is a conveying by conveyor belt on which the products rest and on which their position and stability are in practice not strictly known.

The invention thus has as its object a packaging device, for batch packaging of products, of the bottle, jar, canister, or the like type, within which, for their packaging, the products move along a conveying direction, said batches having, transversely to said conveying direction, at least two products, said device comprising a feed means, to receive products traveling in a single line in the area of an upstream pick-up zone and to bring them to the area of a deposit zone for their subsequent packaging.

This device is characterized in that the feed means comprises, on the one hand, in the pick-up zone, an individual transfer means of the products arriving in a single line, and, on the other hand, at least one collector that is movable and position-controlled, for receiving then moving in a position-controlled way at least one product from the transfer means to the deposit zone, the device further comprising a conveyor in the deposit zone on which the at least one collector deposits the at least one product that it previously picked up in the pick-up zone.

The invention also has as its object a method used by this device, namely a method for feeding a device for packaging products as described above, within which they move in a conveying direction during their batch packaging.

This method is characterized in that the products are transferred in an individually-referenced way from an upstream pick-up zone where the products arrive in an individually-referenced way one following the other to a deposit zone in the area of a conveyor where they then travel in several columns for their packaging.

BRIEF DESCRIPTION OF THE DRAWINGS

The invention will be better understood as a result of the description below, which is based on possible embodiments, explained in a way that is illustrative and in no way limiting, with reference to the accompanying figures, in which.

DETAILED DESCRIPTION OF THE PREFERRED EMBODIMENTS

Figure 1:
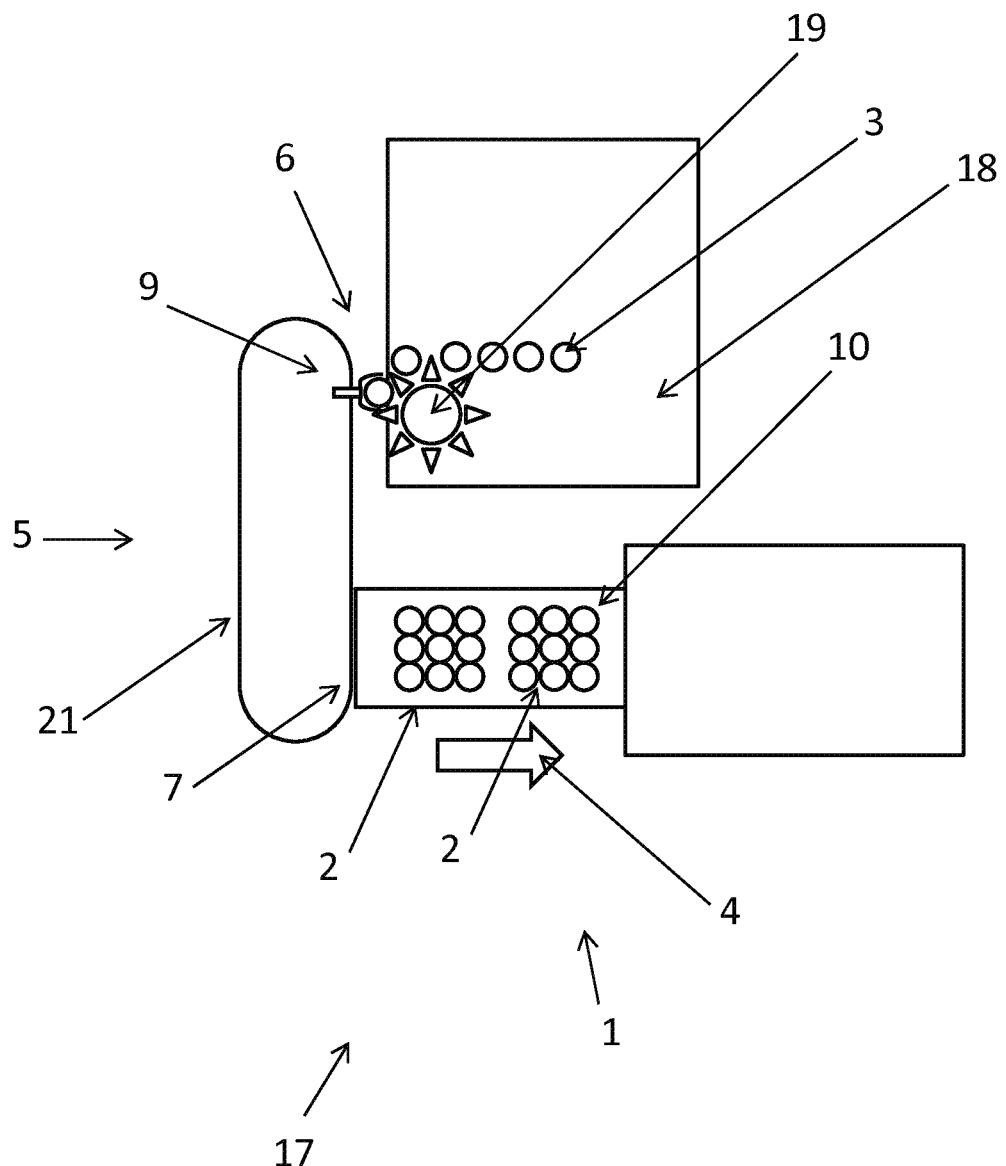
FIG. 1 diagrams a feeding with a shuttle traveling on a closed-circuit rail between a labeling module and a bundling module.
Figure 2:
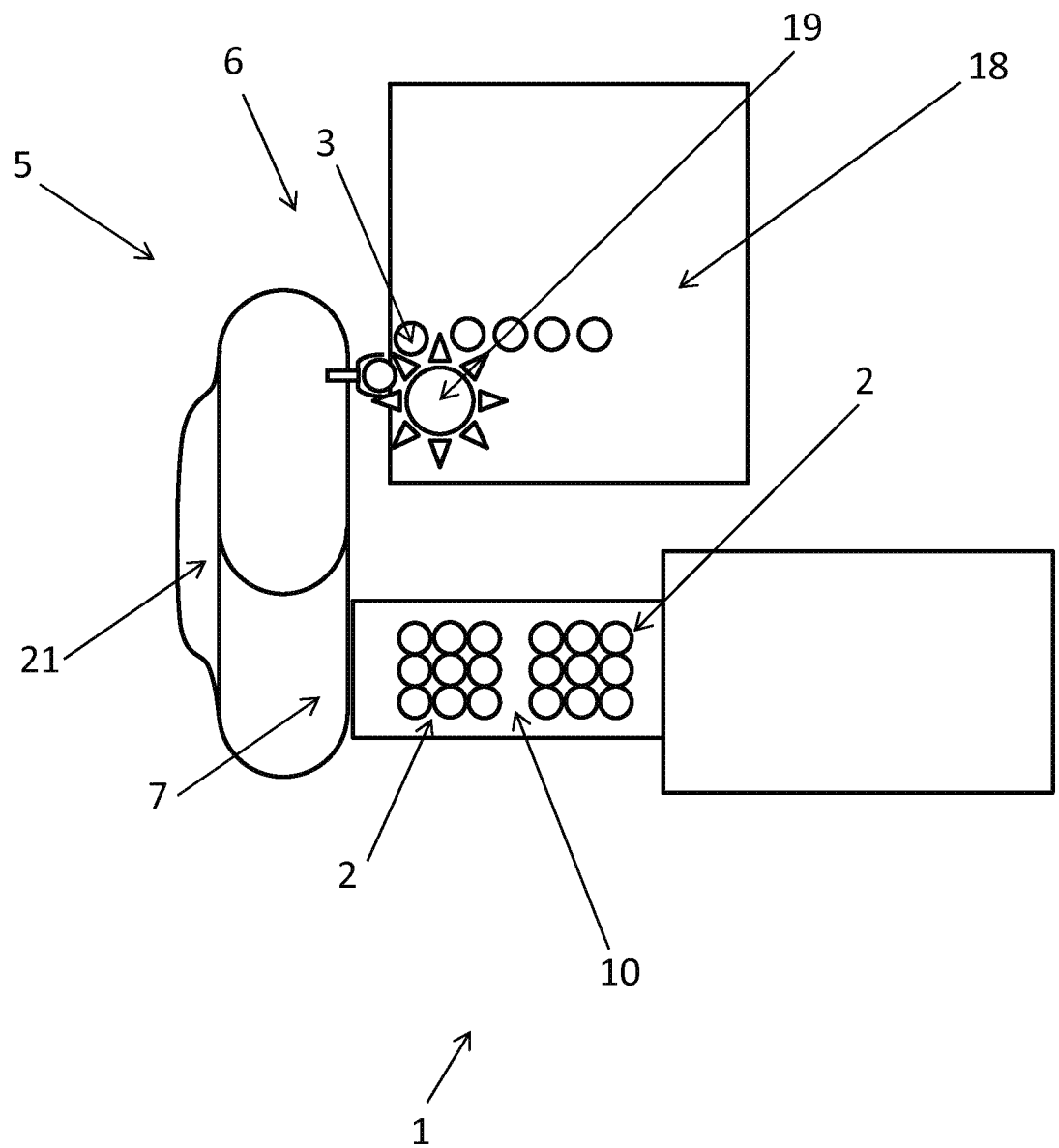
FIG. 2 shows a feeding with an alternate circuit to the one in FIG. 1.

The invention therefore first of all has as its object a packaging device 1, for batch 2 packaging of products 3, of the bottle, jar, canister, or the like type, within which, for their packaging, the products 3 move along a conveying direction 4, said batches 2 having, transversely to said conveying direction 4, at least two products 3, said device 1 comprising a feed means 5, to receive products 3 traveling in a single line in the area of a pick-up zone 6 and to bring them to the area of a deposit zone 7 for their subsequent packaging.

The products 3 are therefore prepared upstream from the packaging device 1, particularly in a preparation group of products 3. These products 3 therefore arrive in the packaging device 1 to be packaged there for shipping. The packaging device 1 therefore generally does not modify the structure itself of the products 1, which is done upstream. Thus, upstream from the packaging device 1, the product 1 is produced by making the container itself, filling it, capping it, labeling it. The sequence of the steps can vary: making the container, labeling, filling, then capping, or making the container, filling, capping, then labeling, etc.

The packaging device 1 is therefore differentiated from the upstream modules in that it does not intrinsically transform the products 3 individually. Generally, the packaging device 1 therefore receives finished products 3, ready to be packaged in batches 2, in the form of a bundle, case, etc. Generally, it receives these products 3 from the last module ensuring the production of the finished product 3, otherwise called preparation group.

This preparation group can therefore be the final module itself, namely a labeling module 18 or a filling-capping module. The preparation group can also include a series of modules still upstream, such as filling, blow molding, capping, indeed the entire series of modules necessary to produce products 3 from preforms, etc. In a preferred way, the module just before the packaging device 1 is a labeling module 18 or a filling-capping module.

As a result of a feed means 5, the packaging device 1 therefore receives the products 3 from the output of a preparation group, which dispenses finished products 3 individually, and which must be put into groups for shipping.

The packaging device 1 can preferably be a packaging by bundling, where a film 16 surrounds a batch 2 of products 3. The packaging device 1 then comprises a feed means 5 to recover the products 3 that have just been finished and to process them by bundling during which a film 16 is wrapped around several products 3 to form from them a self-supported group. The packaging device 1 must therefore ensure both the movement of the products 3 from the preparation group to the subsequent packaging processing modules and the organization of the products 3 into batches 2.

The batches 2, downstream from the feed means 5, have in particular at least one row of several products 3 that are transverse to said conveying direction 4, and even several columns of products 3 extending in the conveying direction 4. The batches 2 can be organized in staggered rows, with one product 3 overlapping between two other products 3 beside it, or in a non-staggered matrix. Of course, the packaging device 1 can be adapted to process several rows of parallel batches 2 in the conveying direction 4.

The feed means 5 therefore recovers the finished products 3 in a pick-up zone 6, in the area of the preparation group, and brings them into a deposit zone 7, from which they will be packaged in bundles. The products 3 are held and positioned individually within the preparation group upstream from the packaging device 1.

According to the invention, the feed means 5 comprises, on the one hand, in the pick-up zone 6, a means 8 for transfer individually of the products 3 arriving in a single line, and, on the other hand, at least one collector 9 that is movable and position-controlled, for receiving and then moving in a position-controlled way at least one product 3 from the transfer means 8 to the deposit zone 7, the device 1 further comprising a conveyor 10 in the deposit zone 7 on which the at least one collector 9 deposits the at least one product 3 that it previously picked up in the pick-up zone 6.

The transfer means 8, which receives the products 3 individually from the preparation group, can take the form of a rotating star between the fingers of which the products 3 can come. The at least one collector 9 interacts with this transfer means 8 to pick up the products 3 that it has. The products 3 therefore pass from the transfer means 8 to the collector 9 while being continuously referenced, unlike configurations in which, for example, a conveyor belt brings a line of products 3 into a collector 9, and where the products 3 are therefore not brought to the collector 9 in a position-controlled and referenced way individually.

The feed means 5 therefore manages the products 3 by systematically controlling the position thereof, so that it is possible, at any time, to know the exact position of each product 3 in the feed means 5. This tracking of the position is ensured successively at least by the transfer means 8 as well as by the collectors 9.

A mechanical interaction is therefore provided between the collector 9 and each product 3 that it carries, so that the position of the collector 9, which is known, directly gives the information of the position of the products 3.

As will be further described later, the speed of the products 3 is ensured by the transfer means 8, which prepares the spacing between the successive products 3. It is found in the pick-up zone 6, where the products 3 travel one after the other with a controlled spacing and in a position-controlled way. The collector 9 ensures, for its part, at least the movement from the pick-up zone 6, directly in the area of the transfer means, in which the position of each product 3 is known, to a conveyor 10 in the deposit zone 7. The referencing of the products 3 is therefore never lost in the feed means 5, in particular since the products 3 of the transfer means 8 are directly picked up by position-controlled collectors 9.

A carrying means or star is generally provided at the output of the preparation group, in which the products 3 are held and referenced individually. As will still be presented in detail below, this carrying means of the preparation group and the transfer means 8 of the packaging device can be the same means.

The collectors 9 and the upstream transfer means 8 are therefore coordinated, and each product 3 is followed in position from said transfer means 8, which, as has already been mentioned, can be the carrying means located at the output of the preparation group, or at least synchronized with it. The specific processing of each product 3 is thus known and controlled all along the process, without loss of control at the time of the packaging step.

The fact of position-referencing the product 3 from the pick-up to the deposit makes it possible to do without conveyors with conveyor belts in which the products can fall or be positioned in a problematic way for a column layout in the conveying direction 4. The knowledge and control of the position of the collectors 9 also make it possible to deposit the products 3 in a position-controlled way, and therefore, for example, to deposit them immediately at a location that corresponds to the subsequent position of the product 3 in a batch 2.

According to a possible additional characteristic, the at least one collector 9 is set in motion between the pick-up zone 6 and the deposit zone 7 as a result of a linear motor principle. The collector 9 is therefore carried on a shuttle whose movement is caused by a linear motor principle. Such a shuttle therefore rests on a base with which a magnetic interaction is produced that moves the shuttle in one direction or the other along the base. The speed of the collector 9 is therefore variable and its position is known specifically, which contributes to controlling the position of the products 3: the position of each collector 9 is known, and, since the collector 9 controls the position of the at least one product 3 that it carries, and even that it holds firmly, the position of each product 3 is therefore known at least relative to the frame of the conveyor 10.

The packaging device 1 is therefore equipped with a control unit that guides the movement of the collectors 9 through the linear motor on which they are mounted. As is also mentioned elsewhere, this guiding unit preferably also controls the movement of the conveyor 10 on which the products 3 are deposited, and this in a coordinated way with the movement of the collectors 9.

According to another possible characteristic, the packaging device 1 further comprises a guide rail 21 with a closed loop portion, the at least one collector 9 taking the form of a shuttle traveling on said rail 21, between the pick-up zone 6 and the deposit zone 7. The rail 21 therefore ensures the linear motor function and extends preferably essentially horizontally, i.e., parallel to the plane of the conveyor 10. The shuttles carrying the collectors 9 therefore travel along this rail 21, which makes it possible for them to arrive both in the pick-up zone 6 and in the deposit zone 7. The closed portion of this rail 21 makes it possible to perform both the coming and the going.

As a result of using a linear motor principle, the collectors 9 can be moved in relation to one another and can be moved separately. The position of each collector 9 is controlled individually.

Figure 8:
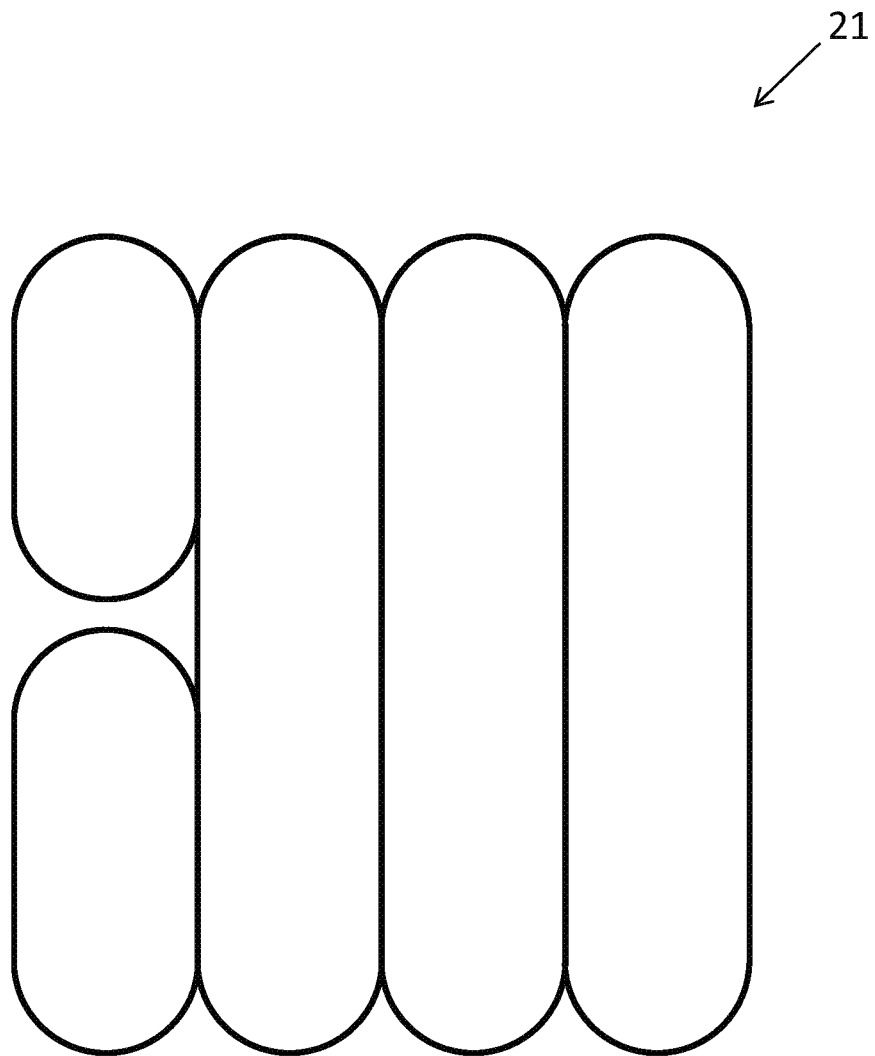
FIG. 8 shows a possibility of travel for the rail on which the collectors travel, with several segments.

In advantageous embodiments, the circuit of the rail 21 comprises an active portion that serves to connect, in one direction and in the other, the pick-up zone 6 and the deposit zone 7, as well as at least one switch making it possible to connect said active portion to other portions of the circuit, as FIG. 8 shows.

The active portion therefore makes it possible for the collector 9 to travel to fulfill its conveying function between the pick-up zone 6 and the deposit zone 7. The other portions can be used, for example, to switch off products 3 by bringing the collectors 9, which are identified as carrying them, onto a particular segment. These other portions can also be used to swap collectors 9, and therefore to remove used collectors 9 for maintenance, and even to switch off collectors 9 that become unsuitable due to a change of format, or else to temporarily leave collectors 9 waiting for a new format of products 3, etc. The rail 21 can thus be provided itself with a zone for accumulating empty or full collectors 9, to ensure an accumulation between the preparation group and the conveyor 10.

Thus, in certain embodiments, the circuit of the guide rail 21 further comprises at least one portion dedicated to receiving waiting collectors 9, particularly collectors 9 coming from the pick-up zone 6 but not yet being authorized to go into the deposit zone 7, or collectors 9 coming from the deposit zone 7 but not yet being authorized to go into the pick-up zone 6, or else collectors 9 designed for another product 3 format.

According to another possible additional characteristic, the circuit of the guide rail 21 further comprises, connected to the active portion, an ejection portion on which the collectors 9 are made to circulate that are conveying at least one non-compliant product 3 collected in the pick-up zone 6, to prevent said product 3 from being brought into the deposit zone 7. Such a portion thus makes it possible to manage the presence of non-compliant products 3 downstream from the transfer means 8 and that are therefore picked up in the collectors 9.

According to another possible additional characteristic, the at least one collector 9 has a capacity that corresponds to a single product 3, so that a collector 9 can take away only a single product 3 at a time from the pick-up zone 6 to the deposit zone 7, the feed means 5 comprising particularly a plurality of collectors 9, preferably at least one group of collectors 9 formed by as many collectors 9 as the number of products 3 that form one row of a batch 2 that is transverse to the conveying direction 4, and even as the number of products 3 that form several aligned rows, intended to contribute to several batches 2 that are aligned transversely.

One of the advantages of the collectors 9 that process the products 3 individually is that the possible ejection off the useful portion of the rail 21 can be done precisely, while avoiding taking off products 3 that are compliant, but mounted on a collector 9 that must be taken off because it comprises at least one non-compliant product 3. Another advantage is that in case of a shortfall on the transfer means 8, the preceding collector 9 can be moved, and the following collector 9 remains in waiting mode. It will thus be understood that generally, the control of the products 3 individually ensures an improved, more efficient, treatment process, since each product 3 undergoes only the operations that relate to it. In other words, the processing of each product 3 is suited specifically to it.

Figure 6:
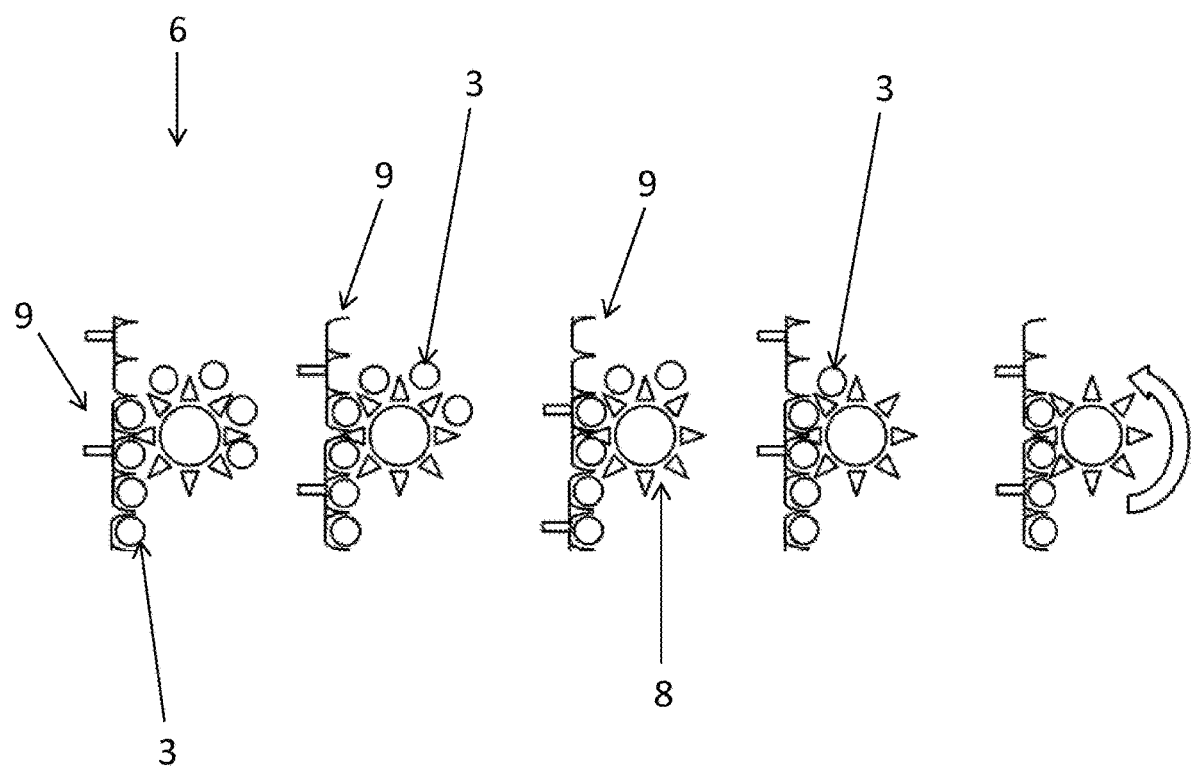
FIG. 6 shows the loading of a multi-product collector from a transfer wheel.

According to another possible characteristic, the at least one collector 9 has a capacity of several products 3, so as to be able to pick up in the pick-up zone 6 and bring to the deposit zone 7 a plurality of products 3 at a time, preferably as many products 3 as the number of products 3 that form a row of the batch 2 that is transverse to the conveying direction 4, and even several aligned rows intended for several batches 2 beside one another. The multiple products 3 that the collector 9 can take therefore arrive one after the other in the collector 9, and, as FIG. 6 shows, the collector 9 is moved gradually to put an open receiving receptacle opposite each new product 3 to be recovered from the transfer means 8. The advantage of a multiple collector is in particular to be able easily to deposit all of the products 3 simultaneously in the deposit zone 7.

According to another possible additional characteristic, the feed means 5 comprises a plurality of collectors 9 that are movable in relation to one another, particularly to come near to or move away on the guide rail 21.

Since the collectors 9 generally deposit the products 3 at the same location in the longitudinal direction, it is preferable that all of the products 3 that form the same transverse row be effectively deposited at the same time, which simplifies the adjustment of the longitudinal movement of the conveyor 10. In the cases where the entirety of the products 3 of a transverse row is contained in several collectors 9, these collectors 9 can, to deposit the products 3, be grouped against one another and then deposit the products 3 simultaneously.

Of course, this is applicable to the cases where the depositing is done for products 3 that are then distributed in more than one batch 2.

According to another possible additional characteristic, the feed means 5 comprises, to furnish the products 3 individually to the at least one collector 9, in the area of the pick-up zone 6, a means 8 for transfer of products 3 individually, of the star type, the speed of the product 3 in said transfer means 8 and the speed of the collector 9 being parallel, during the transition from one to the other, which is in particular illustrated in FIG. 6. The product 3 therefore does not undergo any variation in either movement or speed during its introduction into the collector 9. The products 3 therefore go from a means of movement in which they are referenced individually, namely the transfer means 8, to another means of movement in which they are once again referenced individually, namely a collector 9. This transition from one to the other is done without impact or pressure for the product 3, which is therefore not destabilized and does not risk falling or being broken.

The device is thus differentiated from the equipment where the products 3 arrive in a collector with a speed that is perpendicular to the subsequent movement of the collector 9, and where the products 3 then undergo impacts that can lead to falls.

As FIG. 6 shows, at the time the product 3 goes from the transfer means 8 to the collector 9, it is driven by a movement of the same speed as the speed that the collector 9 has for heading toward the deposit zone 7. The collector 9, in particular when it is proportioned for several products 3, can therefore have a continuous movement without a risk of jamming.

The packaging device 1 can also have other technical characteristics that are presented in detail below.

According to a possible additional characteristic, the packaging device 1 has a downstream accumulation zone 11, within which the products 3 can be accumulated in several adjacent columns that extend along the conveying direction 4 after having been deposited by the feed means 5, so as to ensure that each row that is transverse to the conveying direction 4 is complete and has all of the products 3 necessary to form a batch 2.

This downstream accumulation zone 11 can be achieved in particular by means of a series of two belts, the first of which travels faster and on which the products 3 are deposited, longitudinal separations delimiting a plurality of channels in which the products 3 are then placed in adjacent columns, for a subsequent separation creating batches 2 of at least one row of several transverse products 3. The collectors 9 therefore bring the products 3 into the extension of the channels delimited by the successive separation walls. The accumulation then makes it possible to ensure that the successive products 3, in the conveying direction 4, are properly against one another and in sufficient number to form a complete batch 2, in particular in the case where each batch 2 must have several transverse rows against one another.

According to another possible additional characteristic, the packaging device 1 comprises, on the one hand, a main conveyor 12, which moves the products 3 for their packaging within said device downstream from the feed means 5, and, on the other hand, a deposit conveyor 13 forming the conveyor 10 on which the at least one collector 9 deposits the at least one product 3 that it picked up, the advancing of the deposit conveyor 13 being synchronized with the successive depositing of the products 3 on it that is ensured by the at least one collector 9.

The main conveyor 12 ensures the movement of the products 3 during their processing by packaging of the bundling type, and can have separate segments, in particular for a circulation within a selection module 22, a cycler module 14, a covering means 15, and even a heat-shrinking tunnel for film 16.

It is therefore proposed here to have, on the one hand, a deposit conveyor 13, dedicated to receiving the products 3 deposited by the collectors 9, and, on the other hand, a main conveyor 12, downstream from the deposit conveyor 13 that feeds it. The operation of the deposit conveyor 13 can thus be synchronized with the depositing of products 3 by the collectors 9, so that they successively form the transverse rows of the batches 2, while the main conveyor 12, in particular if it is the conveyor ensuring the transfer of the products within the shrink tunnel, continues to operate, for example, continuously. The deposit conveyor 13 therefore advances by a distance corresponding to one product 3 in the longitudinal direction of the conveying direction 4 to bring forth a free receiving surface for the following row. The advance of the deposit conveyor 13, dedicated to the depositing, can thus be calculated so that the rows of the same batch 2 come into contact with one another, but so that the rows of different batches 2 are separated.

It will be understood that it is advantageous to deposit the products 3 as close as possible to the covering, to benefit most from the position-referencing that is ensured by the feed means 5 and to avoid the portions of conveyors on which the products 3 cannot be referenced.

The packaging device 1 preferably takes the form of a piece of bundling packaging equipment, where the successive batches 2 are wrapped with a film 16. Such a packaging device 1 comprises at least, before the shrink oven, a covering means 15 to wrap the successive batches 2 with film 16. The correct spacing of the batches 2 in the conveying direction 4 can be ensured by the sequence of a selection module 22 and a cycler module 14, which aim essentially to bring to the input of the covering module 15 compact and complete and correctly-spaced batches 2.

The feed means 5 can then deposit the products 3 upstream from these two modules, which will be responsible for delimiting the batches 2 longitudinally. The formation of the batches 2 can then be ensured at the time of the depositing of the products 3 by the feed means 5. In these cases, the packaging device 1 comprises a module designed to separate, longitudinally from one another in the conveying direction 4, the products 3 organized in adjacent columns extending in said direction, so as to form successive batches 2, of the cycler module 14 or the selection module 22 type, the feed means 5 depositing the products 3 at the input of said module, optionally in the area of a deposit conveyor 13.

The feed means 5 can also deposit the products 3 in batches 2 directly, particularly by depositing them in the same location in the deposit zone 7, the disengagement of the products 3 previously deposited being ensured by the movement of the deposit conveyor 13, and even by depositing them at different locations to make up a batch 2 whose products 3 will be moved only once it will have been completed. If the batches 2 are organized directly during the depositing by the feed means 5, it is conceivable that the collectors 9 release the products 3 directly in the area of the covering module 15, where they will be wrapped with film 16 once the batch 2 is complete. In these embodiments of the packaging device 1, it comprises a covering means 15, where the products 3 that are organized in successive batches 2 are wrapped with film 16 for a subsequent restraint intended for the formation of self-supported bundles held by said film 16, the feed means 5 depositing the products 3 at the input of said covering means 15, optionally directly on the film 16 already partially extended over the belt that then forms the main conveyor 12. This main conveyor 12 can be driven with a continuous movement, the timing of the depositing of the successive products 3 then being coordinated to form the batches 2 directly on it.

The invention also has as its object a method using the invention as described above, namely a method for feeding a device 1 for packaging products as described above, within which they move in a conveying direction 4 during their packaging in batches 2, particularly by bundling.

According to the invention, the products 3 are transferred in an individually-referenced way from a pick-up zone 6 where the products 3 arrive in an individually-referenced way, one following the other to a deposit zone 7 in the area of a conveyor 10 where they then travel in several columns for their packaging. The products 3 are therefore deposited in successive longitudinal columns directly by the feed means 5. Their correct positioning for bundled packaging by lots 2 is therefore controlled and guaranteed, unlike feeding solutions based on conveyors of the moving-belt type.

According to a possible additional characteristic, the method comprises an ejection step, after the pick-up of the product 3, during which a collector 9 comprising at least one non-compliant product 3 is discharged from the circuit connecting it to the deposit zone 7. The ejection of non-compliant products 3 is therefore done in the area of the collectors 9, as a result of the design of the circuit on which they travel and as a result of their individual guiding. Since the position of each product 3 is known, it is possible to avoid supplying defective products 3 into the batches 2.

According to another possible additional characteristic, after the pick-up of products 3, the collectors 9 are grouped to form together a group of products 3 that are aligned and that are to be simultaneously deposited, particularly a row of a batch 2, which makes it possible in particular to use one deposit step for the group of products 3, and this in a simultaneous way.

The method can also have other technical characteristics that are presented in detail below.

According to a possible additional characteristic, several products 3 are simultaneously deposited on the conveyor 10 by each collector 9 in the deposit zone 7, in particular all of the products 3 forming a complete row transverse to the conveying direction 4 and thus participating in the making of at least one batch 2. The collectors 9 therefore release at the same time all of the products 3 that form a transverse row in the batch 2, which makes it possible to simplify the synchronization of the movement of the conveyor 10 or dedicated deposit conveyor 13. The depositing by the collectors 9 can thus form the successive transverse rows of a single batch 2 or of several batches 2 at the same time, in the cases where the packaging device 1 processes several columns of batches 2 that are beside one another. At the time of the depositing, the products 3 in the collectors 9 therefore reproduce the shape of the transverse row.

In the cases where a collector 9 does not alone convey the entirety of the products 3, several collectors 9 can be brought near to one another to reproduce, together, the configuration of the row of the batch 2.

According to another possible additional characteristic, the movement of advance of the conveyor 10 on which the products 3 are deposited and the frequency of depositing products 3 on it are coordinated, so that the conveyor 10 advances by the equivalent of one transverse row as soon as such a row has been deposited, to make room for the next row in the batch 2 or else as soon as the collectors 9, intended to transfer together an entire row of a future batch 2, have deposited the products 3 that it contained.

The packaging device 1 described below can also be used in a processing machine 17 described below.

It then involves a machine 17 for processing products 3, of the bottle, jar, canister, or other container type, comprising a group for preparation of individual products 3, delivering finished and individually-referenced products 3 one behind the other in a single line.

As has already been described above, the preparation group for products 3 consists in at least the final step of production of the products 3 themselves, and even at least one other upstream step of it. The group for preparation of products 3 thus comprises in particular, for example, a plastic bottle blow-molding module, a filling module in which the products 3 are filled, a capping module where the products 3 are capped, and/or a labeling module 18 within which a label is affixed on each successive product 3 individually, particularly by gluing or printing. The preparation group can thus consist essentially in a final labeling module 18, or else any finalizing module of product 3 or any combination of such modules.

This machine further comprises, mounted downstream from said preparation group and receiving the products 3 that the preparation group dispenses, a packaging device 1 as described above. At the output of the preparation group, the products 3 are therefore individually position-referenced and are fundamentally finished and ready for packaging into batches 2 by the packaging device 1 whose feed means 5 preserves the individual referencing of the products 3.

In advantageous configurations, such as the ones diagrammed in FIGS. 1 to 5, the preparation group and the packaging device 1 are arranged so that, seen from above, the feed means 5, between the preparation group and the following elements of the packaging device 1, extend approximately perpendicular to the conveying direction 4 of the conveyor 10 in the deposit zone 7, or of the main conveyor 12. More particularly, the preparation group is therefore as housed between, on the one hand, the feed means 5 and, in perpendicular, the equipment following the packaging device 1. This ends then in a configuration where the collectors 9 are easy to access in case of a need for maintenance, and where an extremely compact configuration can be obtained to contain both the packaging device 1 and the upstream preparation group.

The collectors 9, between, on the one hand, the preparation group, and, on the other hand, the following modules of the packaging device 1, such as the selection module 22 or cycler module 14 or the covering means 15, are therefore driven by a movement that is essentially perpendicular to the conveying direction 4 of the main conveyor 12. The overall arrangement therefore forms a compact machine, and the various functional groups therefore remain accessible. The packaging device 1 thus forms, seen from above, an L configuration, in the hollow of which is found the preparation group.

According to a possible additional characteristic, the processing machine comprises an ejection means to remove, before the pick-up by the feed means 5, the non-compliant products 3 at the output of the preparation group. This ejection is therefore positioned preferably in the area of the carrying means at the output of the preparation group, since the products 3 are referenced there and known by position individually. The products 3 detected upstream as non-compliant are thus ejected, and it is avoided that non-compliant products 3 are picked up by the collectors 9, which ensures that the products 3 provided by the feed means 5 are all compliant.

In particular embodiments, the transfer means 8 of the packaging device 1 forms the output of the preparation group and thus itself ensures the transfer of products 3 between, on the one hand, the preparation group, and, on the other hand, the packaging device 1, more particularly directly in the area of the collectors 9 of the feed means 5. The transfer means 8 thus forms both the output of the preparation group and the input of the feed means 5 of the packaging device 1. The processing machine 17 thus ensures itself and, in an integrated way, on the one hand, the function of the preparation group, namely the labeling or final filling-capping, and also even upstream preparation functions, and, on the other hand, the function of packaging of the products 3 that are dispensed. The processing machine 7 is therefore provided with one and the same means processing the products 3 in an individually-referenced way at the interface between the packaging device 1 and the preparation group. The finished products 3 at the output of the preparation group therefore travel on a transfer means 8 in the area where the collectors 9 of the feed means 5 come to pick them up directly. The continuity of the referencing is thus ensured. In other words, the feed means 5 of the packaging device 1 takes the products 3 directly at the referenced output of the products 3 of the preparation group.

According to a possible additional characteristic, the processing machine 17 has, on the one hand, a wheel 19, for referenced transfer, positioned at the output of the preparation group and delivering the products 3 individually, and, on the other hand, a screw 20 between said wheel 19 and the transfer means 8 of the feed means 5, said screw 20 and the transfer means 8 being synchronized. The referenced transfer wheel 19 can take the shape of a star at the output of the labeling module 18 that forms the preparation group. The screw 20 is therefore synchronized with the movement of the transfer means 8 downstream, which brings the products to the collectors 9 of the feed means 5. It makes it possible either to move the products 3 in a referenced way from the output of the upstream preparation group to the transfer means 8, or to recreate a referencing.

In certain embodiments, the screw 20 is also synchronized with the transfer wheel 19 of the output of the preparation group, so as to guarantee a position-controlled movement of the products 3 from the output of the labeling module 18 or preparation group, to the pick-up by the at least one collector 9. The position control of each product is therefore optimal, and the process is efficient, suited to each product 3.

It is also conceivable that the processing machine 17 has an upstream accumulation zone 23 for the products 3 downstream from the wheel 19 and upstream from the screw 20, where the products 3 are freely accumulated in a single line to form a continuous flow even if the flow of entering products 3 is interrupted, for example considering an ejection, upstream, of non-compliant products 3.

Figure 7:
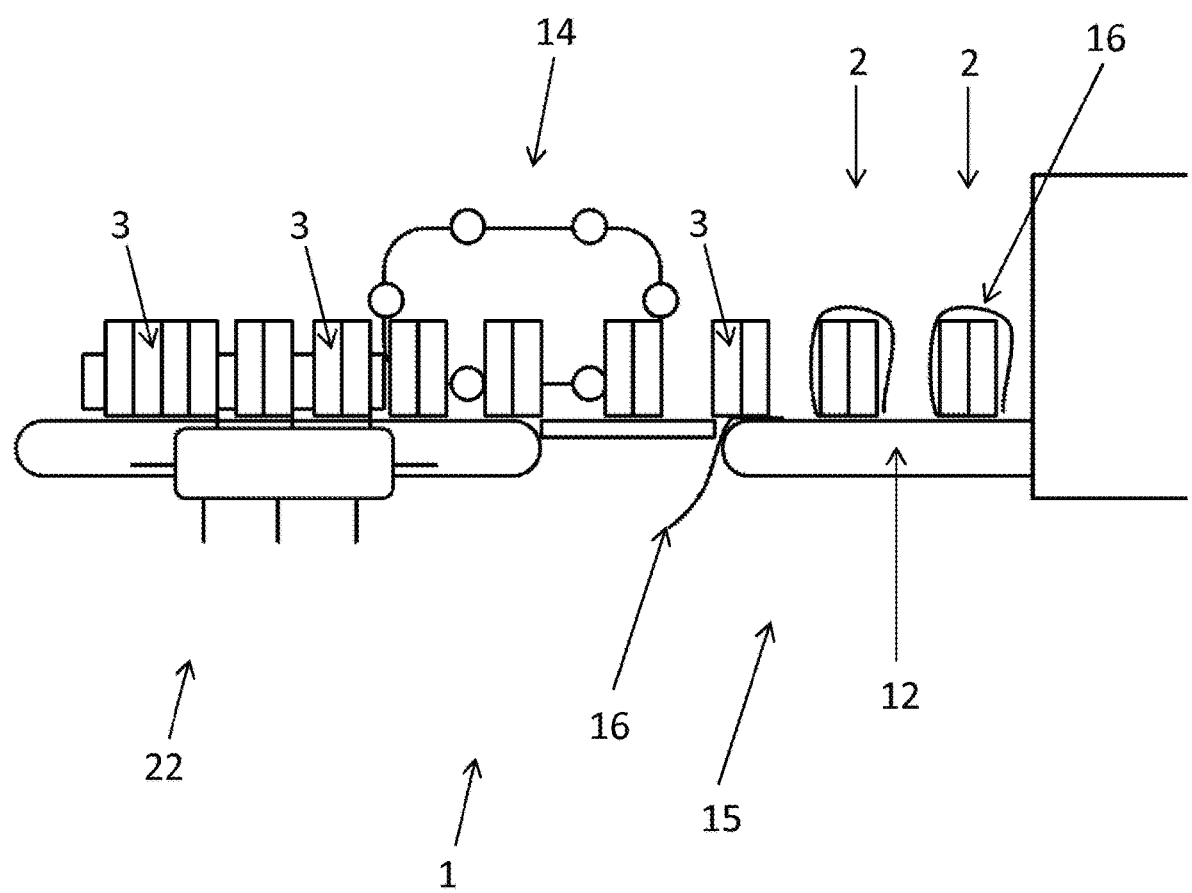
FIG. 7 diagrams the traditional architecture of a piece of bundling packaging equipment.

In the embodiment illustrated in the accompanying figures, the packaging device 1 takes the form of a bundling device, in which, for the bundling operation itself, the products 3 travel on a main conveyor 12 in the form of batches 2, in a conveying direction 4. A batch 2 has several products 3 aligned in a row that is transverse to the conveying direction 4, and generally also several products 3 aligned in the conveying direction 4. A batch 2 therefore has a matrix configuration, with or without staggering, the products 3 then being aligned compactly both in the conveying direction 4 and transversely. As FIG. 7 shows, the batches 2 thus move in the packaging device 1 while being spaced from one another in the conveying direction 4. In such a packaging device 1, for the bundling operation, a batch 2 of products 3 generally is wrapped with a plastic film 16, then travels into a heated tunnel where the film 16 shrinks and then holds the products 3 against one another.

The products 3 are generally bottles, jars, etc., filled and labeled in a preparation group, before this secondary packaging step that, for its part, aims to group them and bind them in self-supported bundles. Upstream from this packaging device 1, therefore, there is equipment that produces the product 3 itself, generally ending with a labeling step. Such a labeling module 18 generates at its output individual products 3, one after the other, generally by means of a rotating carousel, the packaging device 1 producing, for its part, successive batches 2 each comprising several products 3. At the output of the labeling module 18, the products 3 therefore travel one following the other in the direction of advance. A labeling module 18 using rotating elements, of the carousel type, on the periphery of which the products 3 are located, is, for example, described in US2010276028.

Generally, the labeling module 18 comprises at least, at its output, one means for carrying the individual products 3, such as a rotating star between the fingers of which the products 3 are found. At the output of the labeling module 18, the products 3 are therefore moved in a controlled manner individually by this carrying means, unlike, for example, a loose carrying solution where the position of each product 3 is not known precisely, or even a conveying by column on a belt, then not controlled because it does not prevent the sliding of the products 3 and even their falling, being unresponsive to their absence, etc.

The packaging device 1 is thus equipped with a feed means 5, which ensures its supplying of products 3 from the output of the labeling module 18. As FIG. 1 shows, the organization of the products 3 must go from an organization of a single column at the output of the labeling module 18 or preparation group to an organization of several columns for packaging in the packaging device 1 in the form of batches 2 based on rows of several products 3 each. Several batches 2 can further be found aligned transversely to the conveying direction 4. Going from the single-line configuration to the multi-line configuration is achieved by means of the feed means 5, as it is described here.

The feed means 5 thus comprise at least one movable collector 9, this collector 9 being able to pick up and move at least one product 3 from the pick-up zone 6, where the products 3 still travel in a single line, to the deposit zone 7 where the products 3 are organized in several columns on a conveyor 10 that takes them to be packaged. FIG. 1 shows, for example, a feeding device 5 that comprises only one collector 9, this collector 9 being able in turn to receive a single product 3 and to place it in the corresponding column.

The collector 9 of the feed means 5 is movable in a controlled and known way, which makes it possible to know at each moment with precision the position of the at least one product 3 that it moves. The collector 9 thus comprises, for example, for each product 3 that it must move, a receptacle to simply at least hold the product 3 by the body, or else a gripper to grab strictly speaking each product 3, at its neck or elsewhere.

The position of the collector 9, when it lets go of the products 3 in the deposit zone 7, is therefore known and controlled, at least in the direction that is transverse to the conveying direction 4. This thus makes it possible to guarantee the transverse position of the at least one product 3 brought by the at least one collector 9 and therefore to deposit said at least one product 3 immediately at the proper location in the transverse direction. Actually, the makeup of the batches necessitates products 3 distributed transversely to the conveying direction 4, which such a collector 9 can achieve by a known and controlled position, designed to ensure a referencing of the at least one product 3 that it moves. The collectors 9 are actually preferably equipped with mechanical means to pick up each product 3 separately, and are mounted on a movable shuttle in a controlled way.

The product 3 is therefore referenced between the pick-up zone 6, which can be directly the output of the preparation group, and the deposit zone 7, from which the secondary packaging operation itself is performed. It is thus possible to control exactly the location where the product 3 will be deposited on the conveyor 10, i.e., in particular in the area of whatever longitudinal column. Thus, as a result of the control and of the referencing of the product 3 during the travel and during the depositing in the deposit zone 7, it is possible to deposit a product 3 intended to form the first product 3 of a transverse row of a batch 2, then, with another collector 9, to deposit the product 3 intended to form the second product 3 of such a row, then that for the third product 3 of the row, etc. It is, of course, possible to simultaneously release all of the products 3 forming a transverse row of a batch 2. A collector 9 can actually collect several products 3 successively while receiving them beside one another in a direction that is then transverse to the conveying direction 4, so that the simultaneous depositing of all of the products 3 immediately leads to the making of a transverse row of several products 3, to create, by grouping several of them, at least one batch 2, and even several batches 2 aligned transversely to the conveying direction 4. The referencing of the individual products 3 by means of the movable collector 9 in a controlled way thus immediately ensures the controlled depositing in successive longitudinal columns.

The products 3 are released by the collectors 9 in the area of a deposit zone 7 in which a conveyor 10 is found. They are deposited on the conveyor 10 that then introduces them into the core of the sequence of the packaging steps: traveling in separate channels; separation of the groups of transverse rows that define a batch 2; synchronization with the covering or wrapping; or covering directly. The products 3 are thus deposited at the latest during the covering itself, or wrapping by the film 16, directly at the input of one of these steps. As will be further described below, the release of the products 3 can therefore, depending on the configurations, be done at different locations before the wrapping of the batch 2 with the film 16 in the covering means 15: either at the input of a conveying in channels; or at the input of a referencing cycler; or directly at the input of the covering table 15.

A longitudinal accumulation can be provided downstream from the depositing by the collector 9, and even directly in the area of the deposit zone 7. Traveling channels are then preferably accommodated preferably by means of longitudinal walls to prevent the overlapping of the products 3 in the form of a staggered organization that would cause the advantage of the transverse position-controlled depositing to be lost. The products 3 are then accumulated in these channels of longitudinal columns, which guarantees the presence of a sufficient number of products 3 in the conveying direction 4 to make up batches 2 formed by several transverse rows.

Such a downstream accumulation zone 11, downstream from the transfer, by the fleet of collectors 9 that comprises the feed means 5 makes it possible in particular to avoid gaps in the continuous matrix arrangement of the products 3 as is required for the packaging of bundled batches 2. It also makes it possible to use configurations where the number of products 3 that each collector 9 conveys does not correspond to the number of products 3 of a transverse row of a batch 2. Actually, in cases of this kind, the products 3 of the same row are not necessarily released at the same time, and it is then useful to provide such a downstream accumulation zone 11 to complete each transverse row.

In advantageous embodiments, each collector 9 is able to receive several products 3 and to move them simultaneously toward the deposit zone 7. The products 3 are therefore received successively in such a collector 9 from the output of the labeling module 18, preferably directly in the area of the carrying means at its star-type output. The collector 9 thus has single reception zones that are aligned in a direction that corresponds subsequently to the direction that is transverse to the conveying direction 4, or the direction of a row. The products 3 of the collector 9 are then all deposited simultaneously on the conveyor 10 in the deposit zone 7. This assembly of products 3 thus directly forms a row of the batch 2 that is transverse to the conveying direction 4, and the break-up step and then organization of a flow of products 3 that is initially single-line are avoided. Of course, it is possible to perform such an operation for several batches 2 simultaneously.

It is then enough, by a movement of the conveyor 10 on which the row has just been deposited, to release it to be able to receive the products 3 from the next collector 9. Preferably, after depositing the products 3 that are intended to form a row of the batch 2, the conveyor 10 advances by a distance that corresponds to such a row, so that the next row comes against the preceding one, which immediately, and by the sole collection-then-transfer operation results in the formation of a compact batch 2. The spacing between the batches 2 can be managed by lengthening the period of time that separates two successive deposits of products 3 intended to form a row and/or by speeding up the movement of the conveyor 10.

Of course, it is important to prevent the defective or non-compliant products 3 at the output of the labeling module 18 from ending up in batches 2 that are then wrapped with film 16 and packaged in the packaging device 2, which would then render the entire batch 2 non-compliant.

The ejection of non-compliant products 3 can be organized in the area of the output of the labeling module 18, before the pick-up of the products 3 by the collectors 9, in the area of the star carrying means. Thus, a control means is incorporated within the labeling module 18 and makes it possible to identify the products 3 that are not acceptable. Since the travel of each product 3 within the labeling module 18 is followed, it is possible to eject the non-compliant products 3 precisely, in particular in the area of the individual carrying means placed at the output of the labeling module 18 that forms the preparation group. For example, a specific conveyor can be provided in the area of the star wheel at the output of the labeling module 18 so that the non-compliant products 3 are deposited there, so that only the compliant products 3 can continue their travel to the collectors 9. The flow of products 3 downstream from this star can therefore have interruptions or missing products 3, which correspond to products 3 that have been eliminated upstream, and the operation of the collectors 9 is adjusted.

The ejection, downstream from the labeling module 18, of the non-compliant products 3 can also be ensured by the collectors 9 themselves, once the products 3 are picked up. In particular, when the collectors 9 are collectors 9 provided for a single product 3 at a time, the collector 9 identified as moving a non-compliant product 3 can thus quite simply not be brought into the deposit zone 7. Alternately, a complementary device can remove from the collector the defective product 3, etc.

It is then understood that the ejection of non-compliant products 3, upstream from the pick-up of the products 3 by the collectors 9, or at least upstream from the depositing by the collectors 9, produces gaps in products 3 that it is suitable to manage to avoid ending up with incomplete batches 2.

A single-line free accumulation zone can, for example, be provided for the products 3 upstream from the feed means 5, which guarantees that the latter picks up, one after the other, continuously, products 3 that are all compliant. A multi-line accumulation zone can also be provided downstream from the multi-line release of the products 3 by the feed means 5. The plurality of transverse rows that are successive and in contact that the batches 2 comprise is thus defined subsequently in this accumulation, for example by a selection module 22 or else a cycler module 14, see FIG. 7. This downstream accumulation makes it possible for the products 3 that are deposited in a column after a missing product 3 to catch up with those already deposited previously.

As FIGS. 1 to 6 show, the feed means 5 preferably recovers the products 3 in the area of a referenced transfer means 8 or carrying means, generally in the form of a wheel 19 or star with peripheral receptacles in which each time a product 3 can be located at the output of the labeling module 18. The labeling can, moreover, be performed while the products 3 are in this transfer means 8. The collectors 9, for their part, travel on a guide or rail 21 that encounters the peripheral path of the transfer means 8 to be able to perform a carrying change in the area of the products 3 that then go from a carrying by the transfer means 8 or wheel to a carrying by the collectors 9, as illustrated in FIG. 6.

During this transition from one to the other, the collector 9 is preferably driven by a movement similar to that of the product 3 in the wheel 19, thus guaranteeing a fluid passage from one to the other. The receptacle in which the product 3 is located in the area of the wheel or star and the receptacle of the collector 9 in which it must continue its path are therefore at least momentarily driven by a movement of the same speed, direction, orientation, and rapidity. It will be noted that a way of handling the possible absence of product 3 in the wheel after the elimination of a defective product can then consist in not advancing the collector 9 if the receptacle opposite is empty of product 3, which guarantees that the collectors 9 arriving in the deposit zone 7 are systematically filled with compliant products 3.

Figure 5:
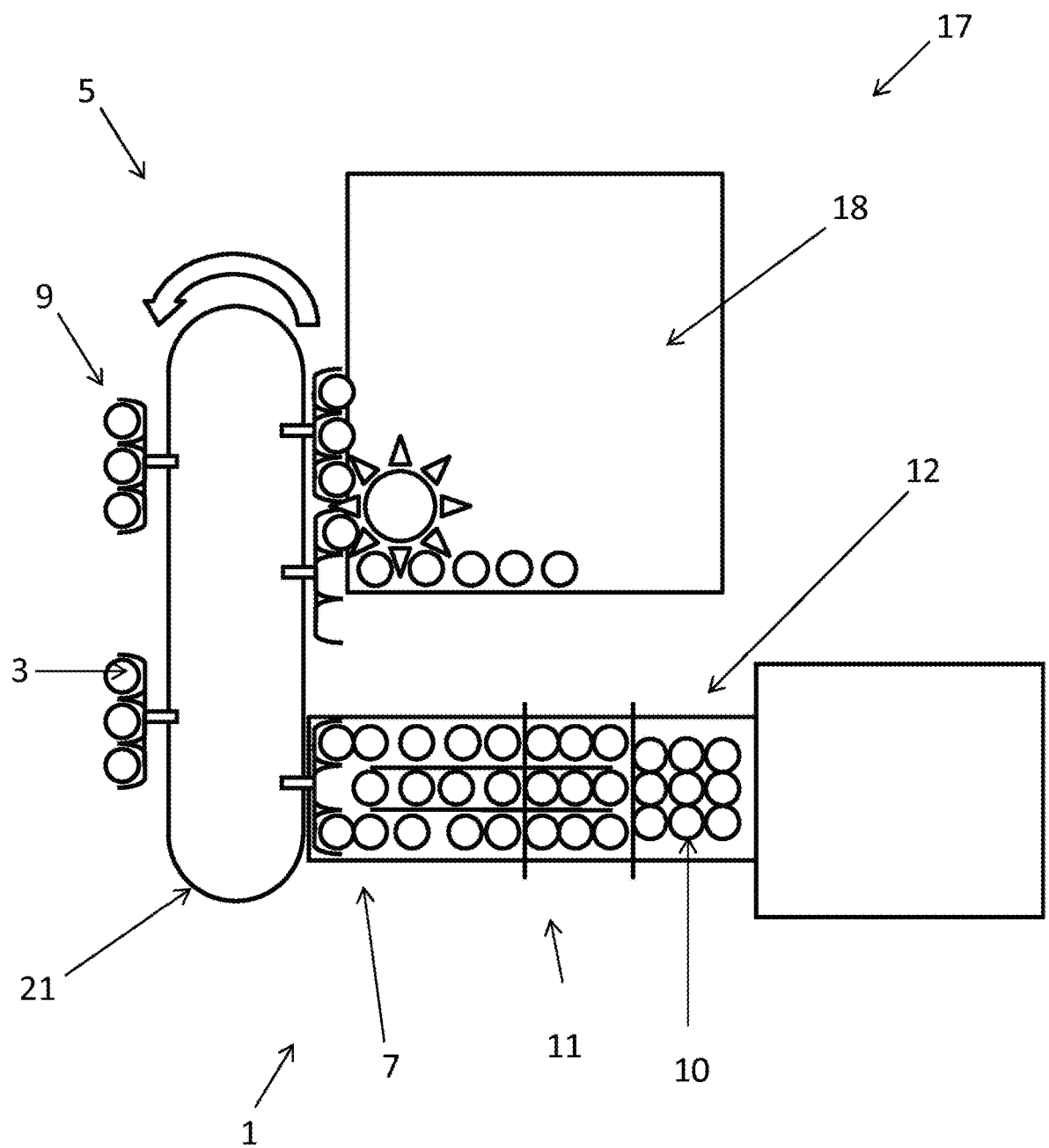
FIG. 5 shows a principle with a reverse sense of travel to that of FIG. 4.

As FIGS. 5 and 6 show, in the case where the collector 9 is scaled for several products 3, once positioned for reception, it extends linearly along a tangent to the output star of the labeling module 18, so that its movement successively brings the single reception zones to the periphery of the star. In the case where the collectors 9 are scaled for a single product 3 at a time, as FIG. 5 shows, for example, the guide rail 21 can have, for example, a curvature such as a half-turn, opposite the curvature of the transfer means 8, and in the area in which the transition of the products 3 from the transfer means 8 to the collectors 9 is managed. The transfer into the collector 9 can also be done while it travels on a straight portion.

It will also be noted that the collectors 9 are therefore used in a cyclic way: after having recovered the at least one product 3, the collector 9 is then going to deposit it, and then, by a return portion, come back to begin this cycle again. The rail 21 therefore has a useful closed-loop portion on which the collectors 9 travel to move the products 3 between the two zones.

The integration between, on the one hand, the labeling module 18 and, on the other hand, downstream, the packaging device 1, and, more particularly, its feed means 5, can be arranged in different ways. For example, in FIG. 1, 2, 3 or 5, the feed means 5 picks up the products 3 directly from the star or wheel 19 at the output of the labeling module 18 or preparation group, which results in a piece of equipment incorporating both the function of the at least final making of the product 3, of the labeling type, and the function of packaging by bundling of batches 2.

Figure 4:
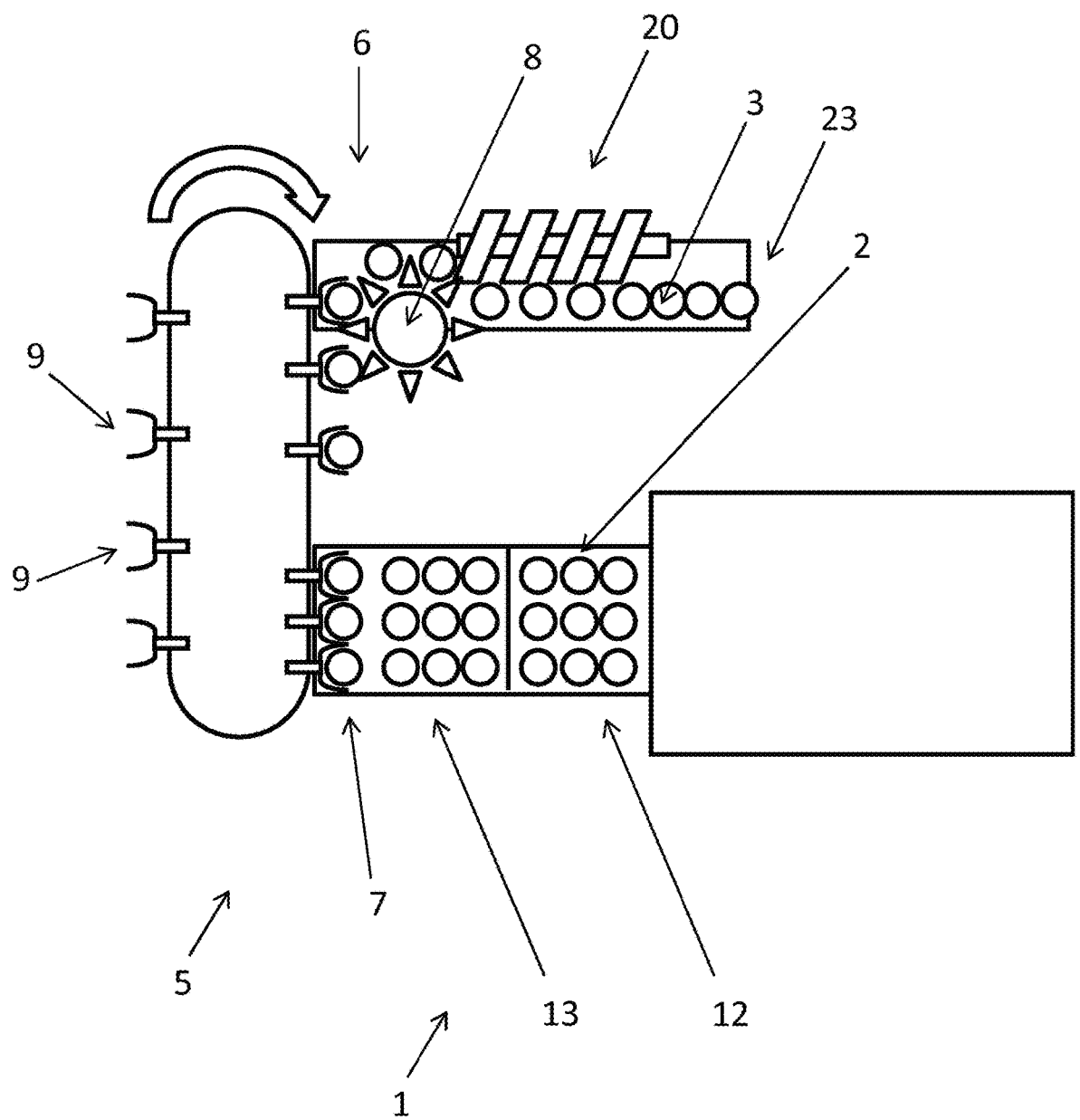
FIG. 4 shows a piece of equipment to be mounted downstream from a preparation group, comprising a screw for spacing and a transfer wheel.

As FIG. 4 shows, the feed means 5 of the packaging device 1 can also load the products 3 from a star that is different from that of the output of the labeling module 18, which makes it possible in particular to reuse an existing labeling module 18, without structural modification, and therefore to propose so-called "retro-fit" solutions. The feeding of this star 8 with products 3 is preferably done by means of a screw 20 whose pitch normally corresponds to the spacing of the receiving receptacles on the star. The pitch can, of course, be scalable between the beginning and the end of the screw 20. Such a screw 20 makes it possible generally to reference products 3 that previously traveled possibly freely. Such a free conveying can come from the preparation group directly or after division of the single-line flow that it dispenses in several parallel flows.

The screw 20 can here be used while being totally synchronized both with the downstream star or transfer means 8 and with the upstream carrying means, at the output of the labeling module 18. In this case, this screw 20 therefore performs a referencing, spacing, and movement function, during which the position of each product 3 is known and controlled from the output of the labeling module 18 to a transfer means 8 that is then offset.

An upstream accumulation zone 23 can also be provided, in which the products 3 coming out of the labeling module 18 one after the other are conveyed freely, for example with a downstream conveyor belt that travels faster than the speed of the screw 20. The screw 20 is then arranged downstream from this upstream accumulation zone 23 and again references the products 3 for their pick-up in the transfer means 8 that requires that the products 3 be spaced from one another in a controlled way. Downstream from the star of the labeling module 18, the products 3, until then referenced individually, therefore go into an upstream accumulation zone 23 in which they are grouped together in contact with one another. To again reference the products 3 after such a loss of control, the feed means 5 is provided preferably with a screw 20, which defines a space between the products 3 and with a wheel that then ensures the transfer of the products 3.

The configurations where the screw 20 is not synchronized make possible a mounting downstream from a labeling module 18 or existing preparation group, without structural modification. The use of a screw 20 that is synchronized on the output of the labeling module 18 necessitates a slight structural adaptation of the existing labeling module 18. The configurations where the products 3 are directly picked up by the collectors 9 at the output of the labeling module 18 form complete, totally integrated machines that ensure both the bundling function and at least one labeling function. In the cases where the wheel of the preparation group and the wheel of the feed means 5 are not the same, the latter makes it possible to correctly reference and control each product 3 before they are picked up individually, by the collectors 9.

Generally, the feed means 5 therefore preferably ensures, on the one hand, the movement of the products 3 from the pick-up zone 6 at the output of the labeling module 18 to the deposit zone 7, which can be situated at different locations upstream from a covering means 15 by film 16, and, on the other hand, the creation, from a continuous single-line flow of products 3 one behind the other, of segments intended to form the rows of the batches 2 that are transverse to the conveying direction 4, thus forming a multi-line flow. The coordination with the advance of the conveyor 10 that successively moves these rows of products 3 in the conveying direction 4 makes it possible to obtain batches 2, each comprising several such rows pressed against one another.

A traditional bundling packaging device 1 has the series of various modules until the one in which the matrix batch 2 of products 3 is wrapped with a film 16, see FIG. 7. The feed device 5 can therefore furnish the products 3 at different locations upstream from this wrapping function:

at the input of a selection module 22 where products 3, previously in a column of products 3 in contact with one another, are successively held by fingers that are slower than their carrying conveyor belt, to create longitudinal spaces;

at the input of a cycler module 14, ensuring, by means of transverse bars that move faster than the carrying conveyor belt, that the longitudinal spaces are compatible with the downstream wrapping with film 16;

at the input of a covering means 15, optionally directly on the film 16 during wrapping.

Of course, in each of the configurations, the products 3 can be deposited by the feed means 5 on a dedicated deposit conveyor 13, then feeding one of these inputs.

Figure 3:
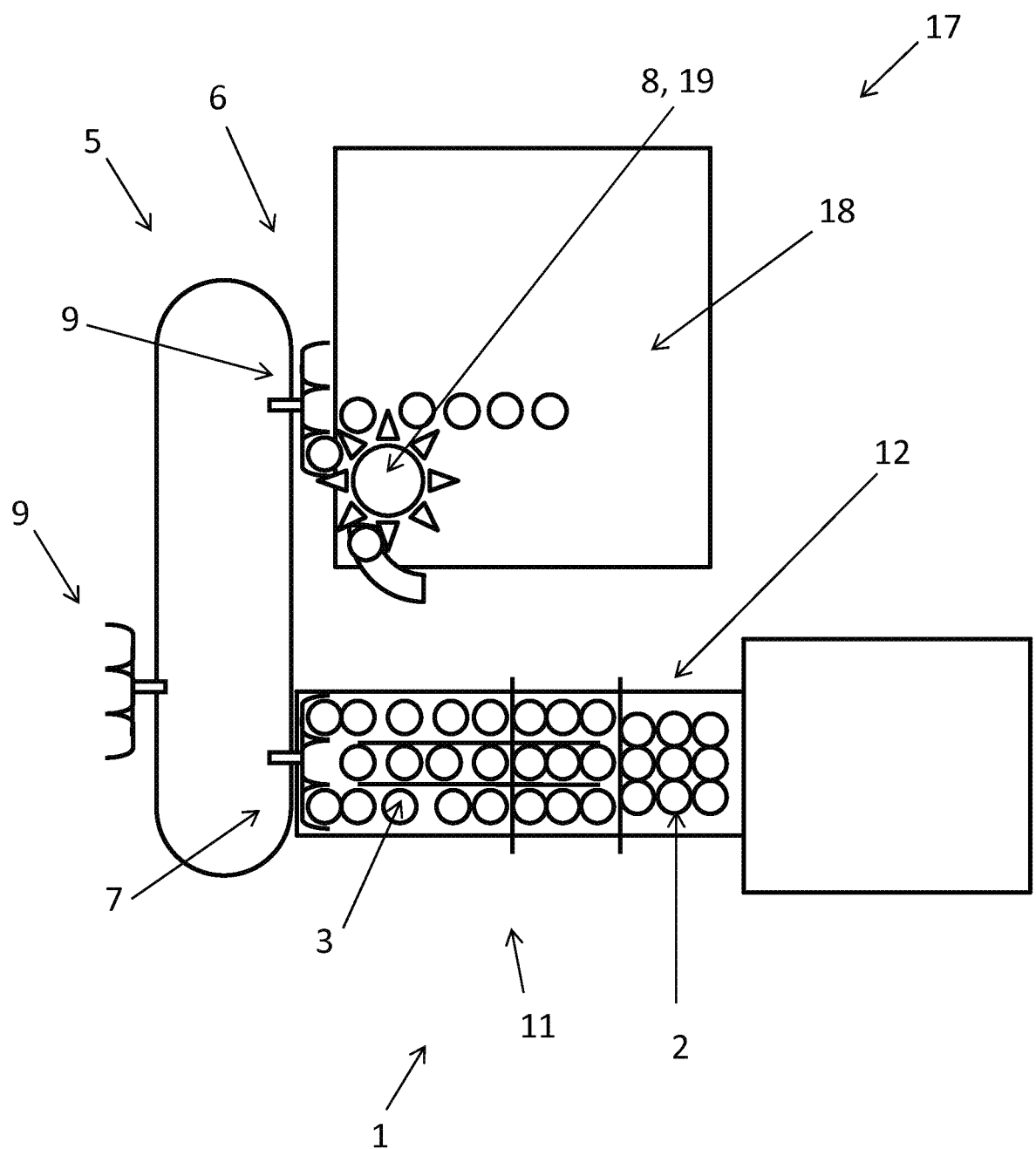
FIG. 3 illustrates an embodiment where each collector can pick up several products simultaneously and deposit them at the input of an accumulation of channels.

As FIGS. 3 and 4 show, the feed means 5 preferably comprises a battery of collectors 9, which travel on a guide rail 21 that comprises said means. It is thus possible to drive these collectors 9 with movement as a result of a magnetic linear motor principle, which has the advantage of being able both to manage and control the position and speed of each collector 9 separately. The collectors 9 are therefore mounted on shuttles that are moved as a result of the linear motor principle.

The collectors 9 are thus movable in relation to one another. Consequently, before the depositing, it is possible to bring them close to one another until they form a compact alignment, extending transversely to the conveying direction 4 in the deposit zone 7 and then to reproduce the row of the batch 2 that is transverse to the conveying direction 4. They can then simultaneously deposit the products 3 that they contain, and then form a row. This is in particular useful with collectors 9 that convey only one product 3 at a time and that are not grouped together when they collect the products 3.

Since the exact position of each collector 9 is known and controlled, it is also possible to provide that they release the at least conveyed product 3, each in turn, in the corresponding longitudinal column, then to advance the deposit conveyor 13 for the next row only once a complete row has been deposited.

As FIGS. 1 to 5 show, the rail 21 is preferably in a closed loop, between two turnarounds that are located approximately, for the one, in the area of the output of the labeling module 18 and, for the other, in the area of the modules that are used for the batch 2 packaging.

The circuit that the rail 21 forms therefore has a main portion that is used for the circulation of the collectors between the pick-up zone 6 and the deposit zone 7 for moving the products 3 between these zones. This circuit can also have branches or switches to other segments that are used, for example, to switch off collectors 9 that are defective or that convey at least one non-compliant product 3. These other segments can also be used for an accumulation of products 3, an accumulation of loaded or empty collectors 9, optionally collectors 9 that are compatible with another format, etc. The complete circuit of the rail 21 can therefore be formed by, for example, a main closed loop, then of portions optionally superposed with one another, that the products 3 can leave and then rejoin, etc., as FIG. 8 shows. Of course, the successive loops are preferably counter-rotating.

The feed means 5 is therefore substituted for the traditional solutions of conveying by belt on which the products 3 rest and where the transition from a single-line flow at the labeling output to a multi-line flow for packaging creates jamming or crushing problems.

It is therefore understood that in the cases where the collectors 9 do not move the number of products 3 that corresponds to a transverse row of the batch 2, in particular the cases where the collectors 9 each carry only one product 3, it is possible to modify each time the transverse position at which the collectors 9 release the products 3, so as to obtain, after several successive deposits, a configuration of products 3 distributed in several longitudinal columns, adjacent transversely to the conveying direction 4 and forming the transverse rows. A downstream accumulation zone 11 can then be used to ensure that the transverse rows are in proper contact with one another.

It is also possible to conceive that collectors 9 with a capacity that is less than a transverse row of the batch 2 are grouped together, continuously or temporarily during the cycle, to convey together as many products 3 as at least one row must contain of them, and to deposit them simultaneously. Using collectors 9 that work with a single product 3 each time meanwhile guarantees the versatility of the feed means 5, since a new batch 2 format, in terms of number of products 3 in a transverse row or in a longitudinal column, requires no structural modification, only a different adjustment of the operation of the collectors 9. Further, an additional advantage of using collectors 9 having a single capacity is their removal from the circuit as soon as the particular product 3 that they convey is not compliant. Thus, it is avoided that products 3 that are in fact compliant are switched off. In the case of a removal of non-compliant products 3 upstream at the pick-up by the collector 9, the use of a collector 9 having a capacity of a single product 3 easily makes it possible to make the collector 9 wait until the arrival of the next compliant product 3.

In the cases where the capacity of the collectors 9 corresponds to the number of products 3 in a transverse row, a collector 9 normally conveys each time the number of products 3 for a row. It is then possible to release simultaneously all of the products 3 that it carries, then creating a row in a single operation. The longitudinal movement of the conveyor on which the products 3 are deposited then makes it possible to accumulate rows against one another in the conveying direction 4.

Therefore, it is as a result of the position-control of the collectors 9 that the feed means 5 ensures the individual distribution of the products 3 in the direction that is transverse to the conveying direction 4.

Further, generally, as each product 3 is picked up directly from the labeling module 18, the orientation of the product 3 is controlled, which has a certain advantage from the moment that the products 3 have a special shape and/or that their orientation in the batch 2 is important, such as, for example, products 3 with a rectangular base, etc., or else circular products 3, but that are to be positioned in a pre-defined way. As each product 3 is picked up and preferably restrained in the collector 9, its orientation is controlled. It is also possible to use a collector 9 with a degree of freedom around a shaft, driven or not, to modify the orientation of the products 3 in a controlled way between the pick-up by the collectors 9 and their deposit.

An accumulation means can also be provided between the pick-up zone 6 and the deposit zone 7, for example with an accumulation table on which the collectors 9 deposit and then pick up again the products 3, or another means making it possible to ensure a buffer between the labeling module 18 and the packaging device 1.

As a result of the invention, it is thus possible to propose a solution for feeding the device for packaging products 3 in batches 2 by bundling, which is reliable, versatile, and which limits in a remarkable way the pieces of equipment to be provided upstream from a covering means 15 to organize the products into a multi-line flow.

Although the above description is based on particular embodiments, it is in no way limiting of the scope of the invention, and modifications can be made, particularly by substitution of technical equivalents or by a different combination of all or part of the characteristics developed above.

The invention claimed is:

1. A packaging device to package products in batches wherein the products in batches move along a conveying direction, said batches having at least two of the products oriented transversely to said conveying direction, said packaging device comprising:
   a transfer device positionable at a pick-up area of a pick-up zone within an upstream module, the transfer device configured to receive an individual transfer of products arriving in a single line traveling in a transfer direction toward the pick-up zone;
   a feed device positionable at the pick-up zone, the feed device operative to receive the products in the pick-up area of the pick-up zone and to then bring the products to a deposit area of a deposit zone for subsequent packaging of the products, the feed device comprising at least one collector that is movable and position-controlled, for receiving and then moving, in a position-controlled way, at least one of the products from the transfer device to the deposit zone, and
   a conveyor in the deposit zone, the conveyor moving products in the conveying direction away from the deposit zone, the conveying direction being different from the transfer direction,
   wherein the at least one collector deposits at least one of the products, previously picked up in the pick-up zone, onto the conveyor, and
   wherein the at least one collector has a movement essentially perpendicular to the conveying direction.

2. The packaging device according to claim 1, further comprising a linear motor, wherein the at least one collector is set in motion between the pick-up zone and the deposit zone through the linear motor.

3. The packaging device according to claim 1, further comprising a guide rail with a closed-loop portion, the at least one collector taking the form of a shuttle traveling on said guide rail, between the pick-up zone and the deposit zone.

4. The packaging device according to claim 3, where a circuit of the guide rail comprises an active portion that serves to connect, in one direction and in the other direction, the pick-up zone and the deposit zone, as well as at least one switch connecting said active portion to other portions of the circuit.

5. The packaging device according to claim 4, where the circuit of the guide rail further comprises at least one waiting portion of the other portions dedicated to receiving waiting collectors of the at least one collector.

6. The packaging device according to claim 4, where the circuit of the guide rail further comprises, connected to the active portion, an ejection portion on which the at least one collector circulates conveying at least one non-compliant of the products picked up in the pick-up zone.

7. The packaging device according to claim 1, where the at least one collector has a capacity that corresponds to a single one of the products, so that one of the at least one collector takes away only a single of the products each time from the pick-up zone to the deposit zone.

8. The packaging device according to claim 1, where the at least one collector has a capacity of plurality of the products, each time to pick up in the pick-up zone and bring to the deposit zone a plurality of the products.

9. The packaging device according to claim 1, where the feed device comprises a plurality of the at least one collector is movable in relation to another collector.

10. The packaging device according to claim 1, where the speed of the product in said transfer device and the speed of the at least one collector are parallel, during a transition from the transfer device to the at least one collector.

11. A method for feeding a packaging device for packaging products, comprising:
moving the products in a transfer direction to a transfer device positionable at a pick-up zone within an upstream module, the transfer device configured to receive an individual transfer of products arriving in a single line traveling in a transfer direction toward the pick-up zone;
transferring the products in an individually-referenced way at known positions from the pick-up zone where the products arrive in an individually-referenced way one following the other at known positions, to a deposit zone in a deposit area of a conveyor where the products then travel in plural columns for packaging of the products; and
moving the products in a conveying direction for packaging in batches, wherein the conveying direction moves products away from the deposit zone and the conveying direction is different from the transfer direction,
wherein the transferring occurs through a movement essentially perpendicular to the conveying direction.

12. The method according to claim 11, further comprising ejecting at least one non-compliant of the products, after the pick-up of the products, during which a collector comprising the at least one non-compliant of the products is discharged from a circuit connecting said collector to the deposit zone.

13. The method according to claim 11, where after the pick-up of the products, a further step of grouping at least one collector to form together a group of the products that are aligned and that are to be simultaneously deposited.

14. The packaging device according to claim 2, further comprising a guide rail with a closed-loop portion, the at one collector being a shuttle traveling on said guide rail, between the pick-up zone and the deposit zone.

15. The packaging device according to claim 5, where the circuit of the guide rail further comprises, connected to the active portion, an ejection portion on which the at least one collector circulates conveying at least one non-compliant of the products picked up in the pick-up zone.

16. The packaging device according to claim 2, where the at least one collector has a capacity corresponding to a single of the products, so that one of the at least one collector take away only a single of the products each time from the pick-up zone to the deposit zone.

17. The packaging device according to claim 3, where the at least one collector has a capacity that corresponds to a single of the products, so that one of the at least one collector takes away only a single of the products each time from the pick-up zone to the deposit zone.

18. The packaging device according to claim 4, where the at least one collector has a capacity that corresponds to a single of the products, so that one of the at least one collector takes away only a single of the products each time from the pick-up zone to the deposit zone.

19. The packaging device according to claim 5, where the at least one collector has a capacity that corresponds to a single of the products, so that one of the at least one collector takes away only a single of the products each time from the pick-up zone to the deposit zone.

20. A packaging device to package products In batches of at least two of the products, said packaging device comprising:
a transfer unit positioned at a pick-up area of a pick-up zone and configured to receive an individual transfer of products arriving in a single line traveling in a transfer direction toward the pick-up zone;
a feed unit located at the pick-up area, the feed unit configured to receive the products traveling in a single line in the pick-up area of the pick-up zone and to then bring the products to a deposit area of a deposit zone for subsequent packaging of the products,
wherein the feed unit comprises, in the pick-up zone, at least one collector that is movable and position-controlled way, at least one of the products from the transfer unit to the deposit zone; and
a conveyor located at the deposit zone, the conveyor moving products in a conveying direction away from the deposit zone, the conveying direction being different from the transfer direction
wherein the least one collector deposits the at least one of the products, previously picked up in the pick-up zone, at the deposit zone onto the conveyor so that the products move in batches along the conveyor in the conveying direction with said batches having at least two of the products orientated transversely to said conveying direction, and
wherein the least one collector has a movement between the pick-up zone and the deposit zone that is perpendicular to the conveying direction.

* * * * *